Jan. 17, 1956    F. P. ZAFFARANO ET AL    2,731,553
CODED CAB SIGNALLING SYSTEM FOR RAILROADS
Filed Aug. 13, 1951    5 Sheets-Sheet 1

FIG. 1A. TRAIN-CARRIED CAB SIGNALLING APPARATUS

INVENTORS
F. P. ZAFFARANO AND
W. K. MAENPAA
BY
Neil W. Reston,
THEIR ATTORNEY.

FIG.3A.

United States Patent Office 2,731,553
Patented Jan. 17, 1956

2,731,553

CODED CAB SIGNALLING SYSTEM FOR RAILROADS

Frank P. Zaffarano and Wilho K. Maenpaa, Rochester, N. Y., assignors to General Railway Signal Company, Rochester, N. Y.

Application August 13, 1951, Serial No. 241,576

20 Claims. (Cl. 246—63)

This invention relates to signalling systems for railroads, and more particularly to cab signalling systems of the continuous inductive coded type.

The safe and efficient operation of trains on railroads, and particularly in block signal territory, calls for a number of signal indications to give the engineman the appropriate information concerning traffic conditions ahead. The desired control of these various indications of wayside or cab signals may be provided by transmitting different codes of rail current over the track rails of the track section or track sections constituting a given block, as distinctive from a system using steadily energized track circuits and associated line circuits for providing control for the desired signal indications.

In a well-known coded track circuit block signal system, the track relay at the entrance end of each track section is intermittently energized by current pulses applied to the track rails at the exit end of that track section at some prescribed code rate selected in accordance with existing traffic conditions. This code-following track relay governs the operation of suitable decoding apparatus to establish distinctive circuits for controlling the indication of the associated wayside signal in accordance with the code rate then being received, and also determines the code rate to be supplied to the next track section in the rear. In this way, the coded track circuit not only detects occupancy of the track section, but also serves as a medium for communicating distinctive controls to the rear for governing the indications of wayside signals in accordance with the principles of automatic block signalling.

In the conventional coded track circuit system, the codes in the track rails comprise pulses of current or "on" periods, separated by like "of" periods, applied at different code rates. The code rates commonly used for automatic block signalling are 75 code pulses per minute for a caution or approach indication (proceed prepared to stop at the next signal), and 180 code pulses per minute for a clear indication (proceed at authorized speed). A code rate of 120 times per minute is also sometimes used for systems having three-block indications to provide a restrictive indication usually called approach-medium, and signifying proceed but reduce speed to approach the next signal at a medium speed.

The application of code pulses at these different code rates to the track rails of a given track section, dependent upon existing traffic conditions, causes the code-following track relay of this track section to operate uniformly at the existing code rate, with periods of energization and deenergization substantially equal. The decoding apparatus commonly controlled by the code-following track relay comprises a decoding transformer, tuned circuits, rectifiers and code responsive relays, organized and operating in a manner familiar to those skilled in the art to establish distinctive circuits for the different code rates, and for absence of coding operation of the track relay when the track section is occupied.

In the conventional coded track circuit wayside signalling system, the code-following track relay is of the type responsive to D. C. energization, and a battery or equivalent source of direct current, or sometimes half-wave rectified alternating current, is used to provide code pulses of unidirectional current suitable for the operation of this type of code-following track relay. In some instances, where stray power currents of commercial 60 cycle frequency do not exist in the track rails to a degree to interfere with the proper coding operation of a track relay, the D. C. code-following track relay may be connected to the track rails through a rectifier, and the code pulses may be A. C. derived from a commercial 60 cycle source.

Considering now cab signal systems of the continuous inductive coded type, the code rate of energization of the track rails ahead of the vehicle equipped for cab signalling is picked up inductively, and then amplified for operation of the decoding apparatus to display the appropriate cab signal indication for existing traffic conditions. In the conventional cab signalling system of this type, code pulses of A. C. rail current are used to induce steady-state voltages during the "on" periods of the code in receiver windings carried by the vehicle in inductive relation to the track rails; and this steady-state A. C. excitation of the receiver windings is amplified and used to operate a master relay or equivalent device governing a transformer and tuned circuit decoder. When this type of cab signal system is used with the conventional D. C. coded track circuit system for wayside signal control, the common practice is to superimpose a cab signalling A. C. rail current on the D. C. code pulses of the track circuit. In this connection, since a sustained energization of the master relay represents a stop indication, and stray currents of 60 cycle commercial power frequency flowing in the rails and capable of exciting the receiver windings may occasionally be found at some plates along the railroad, a special frequency for cab signalling rail current, usually 100 cycles, is ordinarily used; and the vehicle-carried equipment is arranged to respond to such 100 cycle frequency of the legitimate coded rail current, but not to stray rail current of the 60 cycle commercial frequency that may be encountered in the track rails. Hence, when cab signalling is to be provided in territory equipped with D. C. coded track circuits, the prevailing practice is to use an auxiliary power line to provide the distinctive frequency of 100 cycles for the cab signalling rail current, so as to avoid unwanted stop indications due to stray rail current of a commercial power frequency.

Coded track circuits have certain advantages for the control of signal indications on the wayside or on the train, in the way of longer track sections, better shunting characteristics, elimination of signal control line circuits, and the like; and coded track circuits are being extensively installed on railroads. In order to avoid the complication and expense of providing a source of distinctive 100 cycle frequency required when the conventional coded cab signal system is used in territory equipped with D. C. coded track circuits, it has been proposed to employ a different type of cab signal equipment which is operable directly by the D. C. or unidirectional code pulses in the track rails for operation of the coded track circuits, such as disclosed for example, in the prior application of Stafford, Serial No. 171,423, filed June 30, 1950.

In the practical operation of railroads, however, trains may have to be operated over a stretch of track already equipped with 100 cycle coded rail current, as well as over other stretches of track on the same or different railroads which are equipped with D. C. coded track circuits. The motive units for such trains may be equipped with some form of dual equipment convertible by a change-over device to operate on the D. C. and 100 cycle coded rail current in respective stretches of track, as disclosed for example in the prior application of Stafford, Serial No. 171,424, filed June 30, 1950.

Such dual vehicle equipment involves extra apparatus and a change-over device having its operation properly safeguarded; and it is obviously more desirable to have a universal type of equipment which may operate without change equally well on the different kinds of coded rail current that the vehicle may encounter as it runs over stretches of track having different types of trackway equipment. The different kinds of coded rail current to be considered for such a universal vehicle equipment, assuming of course the code rates are the same, may be said to include D. C. or rectified 60 cycle A. C. of the conventional coded track circuit, 100 cycle A. C. characteristic of most existing cab signalling installations of the coded type, and also 60 cycle A. C. which is sometimes used for operation of coded track circuits. Also, for new installations of cab signalling over stretches of track now equipped with steadily energized track circuits and line circuit control of the wayside signals, it may be to advantage to superimpose coded commercial 60 cycle alternating currents on the steadily energized track circuits in preference to coded alternating currents of a frequency of 100 cycles requiring a special power line in addition to the facilities already installed. This, of course, is possible if the appropriate vehicle-carried equipment is available to respond to such coded commercial 60 cycle rail currents.

Considering certain familiar phenomena in electrical circuits which may be made the basis for such a universal type of vehicle-carried equipment, the code pulses of the different kinds of rail current are alike in the respect that each application and removal of rail current in the track rails produces a so-called transient in the vehicle-carried circuit including a receiver winding in inductive relation to a track rail and its external tuning capacitor. In general, any substantial and rapid change in the voltage existing in a circuit including inductance and capacity causes a transitory effect in the circuit during the appreciable time required for it to adjust itself from one stable or steady-state condition to another. The variable voltages and currents existing during the transient period, while the circuit is adjusting itself to the new steady-state condition, are known as transients. Where the circuit includes both inductance and capacitance, there is an exchange of energy between their electromagnetic and electrostatic fields during the transient period, which tends to make the transient voltage and current oscillatory in nature similar to a damped sine wave. The frequency of the oscillatory transient depends in general upon the resonant frequency to which the receiver winding is tuned. The duration of the transient depends upon the rate of energy dissipation in the circuit, more particularly the magnitude of its damping resistance.

In the case of a D. C. rail current pulse, the voltage appearing in the receiver circuit is essentially the oscillatory voltage of the transients, since an impressed voltage is induced in the receiver windings only while the D. C. rail current is changing from nothing to something, and vice versa. In the case of an alternating-current code pulse in the track rails, the voltage in the receiver oscillatory circuit is the resultant of transient and steady-state components; and although there is some voltage induced in the receiver winding throughout the duration of the A. C. code pulse, this voltage is modified in waveform during the transient periods to include the frequency components of the transient. Thus, a transient voltage having certain frequency characteristics appears in the receiver oscillatory circuit each time the rail current, whether unidirectional or alternating in character, is applied or removed, and the receiver circuit has to adjust itself to some new steady-state condition.

In the practical operation of vehicle-carried equipment operable by the transients associated with the application and removal of D. C. code pulses at the level of rail currents ordinarily used for the operation of coded track circuits, a relatively high pickup sensitivity is required, more particularly for dependable operation under varying ballast conditions for long track sections. Such relatively high pickup sensitivity tends to give unwanted response to spurious voltages that may be induced in the receiver winding for various reasons during operation of the vehicle through the equipped territory. For example, stray currents of a commercial frequency in the track rails may occasionally be encountered, and such rail currents are likely to induce spurious voltages in the receiver winding at an energy level comparable with the transient voltages. Also, spurious voltages of a substantial magnitude may be sometimes induced in the receiver windings, as the vehicle runs along the track, due to the motion of the receiver windings in the earth's magnetic field, or other extraneous magnetic fields along the track, such as magnetized portions of the track rails, rail braces, and the like. Such spurious or extraneous influences may be said to be a background of interference or noise for the transient voltages produced by the application and removal of legitimate coded rail current. Such spurious voltages in the receiver windings tend to interfere with the desired reception of the legitimate coded current in the track rails; and, it is desirable to provide an organization for picking up and amplifying the transients associated with the legitimate code pulses in the manner to discriminate effectively against such extraneous interference or noise likely to be encountered in operation. Also, it is desirable to provide an organization for picking up and amplifying a transient in such a way as to discriminate effectively against steady-state alternating currents regardless of whether they be stray currents in the track rails or whether they be the alternating current constituting the code pulses.

With these and other considerations in mind, it is proposed as the principal object of this invention to provide an organization of elements for the vehicle-carried equipment of the universal type for operation without actuation of any change-over device over the coded track circuits, which may be used for different stretches of trackway by railroads, and which involves different kinds of coded rail current, such as direct current, rectified alternating current, and alternating current of commercial 60 cycles or a special frequency of 100 cycles.

A further object of the invention is to provide vehicle-carried equipment of such universal character, in which the effective response to code pulses will not be materially affected by variations in the rate of change of the rail current ahead of the vehicle at different locations in the track circuit, which might otherwise tend to give an improper cab signal indication on the vehicle in a track section occupied by another train ahead under certain conditions subsequently explained.

A still further object of the invention is to provide vehicle-carried equipment of this character which will effectively pick out or segregate, so to speak, the effects of transients produced in the receiver circuits by the application and removal of legitimate code pulses of rail current, from the background of the variety of other voltage effects produced at other times in the receiver circuits for various reasons during operation of the vehicle, so that the desired consistent and dependable operation of decoding apparatus in response to such transients will be obtained under the practical operating conditions encountered on railroads.

Other objects, characteristic features and attributes of the invention will in part be apparent, and in part pointed out as the discussion of the invention progresses.

Generally speaking, and without attempting to define the exact nature and scope of the invention, the vehicle-carried equipment characteristic of this invention in its broader aspects includes receiver windings in inductive relation to the track rails ahead of the vehicle and included in an oscillatory receiver circuit tuned by an external capacitor for resonance at a certain prescribed frequency materially different from the frequencies of excitation of the receiver oscillatory circuit by steady-state rail currents likely to be encountered in operation, an electron tube amplifier having tuning between stages plus circuit elements providing marked degenerative effects for certain frequencies and operating to give an effective output for a prescribed band of frequencies characteristic of receiver excitation by the application and removal of the different kinds of coded rail current, but discriminating effectively against unwanted outputs for the frequencies characteristic of receiver excitation at other times due to steady-state rail currents or certain kinds of extraneous interference during operation, together with suitable decoding apparatus operated by the effective outputs of the amplifier for the successive transients associated with the application and removal of legitimate code pulses of different kinds of current in the track rails ahead of the vehicle.

In addition to utilizing certain prescribed frequency characteristics of the transients as a whole to discriminate between wanted and unwanted amplifier outputs for operation of the decoding apparatus, the vehicle-carried equipment of this invention is also organized to avoid unwanted response to certain kinds of extraneous receiver excitation by providing a mechanical mounting for the receivers so that they have a natural period of physical vibration outside the frequency band of the amplifier, in addition to expedients previously proposed and disclosed, for example, in the prior application of Kendall and Zaffarano, Ser. No. 227,164, filed May 19, 1951, for preventing unwanted response to a variety of other kinds of spurious and extraneous influences encountered in operation.

Other more specific characteristics of structure and function of the organization of this invention and its individual elements will be later explained as a typical specific embodiment of the invention is described.

In order to make clear the nature of this invention, and the way in which it may be practiced, a typical specific embodiment of the invention is illustrated in the accompanying drawings, and the structure, functions, and mode of operation of this specific organization of parts and circuits will be explained in some detail.

In these drawings, in order to simplify the illustration and facilitate an understanding of the nature of the invention and its mode of operation, various parts and circuits are shown diagrammatically, and certain conventional illustrations are employed, these drawings having been made more with the purpose of making it easy to understand the principles and mode of operation of the invention, than to illustrate the specific construction and arrangement of parts to be employed in practice. The various relays and their contacts are illustrated in a conventional manner, and symbols are used to indicate connections to the terminals of batteries or other sources of current, rather than illustrating the complete wiring connections. The symbols (B+) and (B—) indicate connections to the opposite terminals of a source of relatively high voltage suitable for the anode potentials of the electron tubes used, with the conventional ground symbol indicating a connection to a potential level between the (B+) and (B—). The symbols (+) and (—) denote connections to the opposite terminals of a source of suitable voltage such as would be required for the relays, lamps and other devices used.

In the accompanying drawings.

GENERAL ORGANIZATION OF VEHICLE EQUIPMENT

*Receiver circuits.*—A pair of receivers are suitably supported on the vehicle over the track rails ahead of the leading wheels and axles so as to be influenced inductively by the rail current flowing down one track rail, through the wheels and axles of the vehicle and train, and back through the other track rail. Each receiver comprises a laminated iron core of general inverted U-shape, with a coil of insulated wire on each vertical leg, as diagrammatically illustrated in Fig. 1A. Each coil is appropriately supported on its leg of the core, and appropriately insulated and waterproofed in a manner such as disclosed, for example, in prior patent to Reichard, No. 2,090,918, April 24, 1937.

The two coils 15 and 16 for each receiver are so wound and connected in series that the voltages induced in these coils are cumulative for changes in magnetic flux passing in opposite directions through the vertical core legs and coils, but are opposing for changes in flux in the same direction through said vertical core legs and coils. In accordance with familiar principles, coded current in a track rail provides magnetic flux lines around the track rail, as schematically indicated by a dotted line at 13 in Fig. 2; and hence the magnetic flux of such rail current passes through the vertical legs of the receiver core and the coils thereon in opposite directions. Consequently, the voltages induced in the receiver coils 15 and 16 by changes in flux due to coded rail current are cumulative. In the case of external magnetic fields, however, such as the earth's field, fields associated with traction motors, power lines, magnetized bodies along the track, and the like, the magnetic flux lines in general will pass through the vertical core legs and receiver coils in the same direction as indicated by the dotted lines 14 in Fig. 2. Consequently, spurious or extraneous voltages induced in the receiver coils by changes in the flux of such external magnetic fields, or by motion of the coils in such fields, tend to oppose and neutralize each other, at least to the extent that the variation in flux and induced voltages in the respective coils are the same. This binary arrangement of receiver cores and coils is disclosed in the prior application of Kendall et al., Ser. No. 227,164, filed May 19, 1951, and it is not intended to claim this binary coil structure by itself in this case.

Figure 1A:
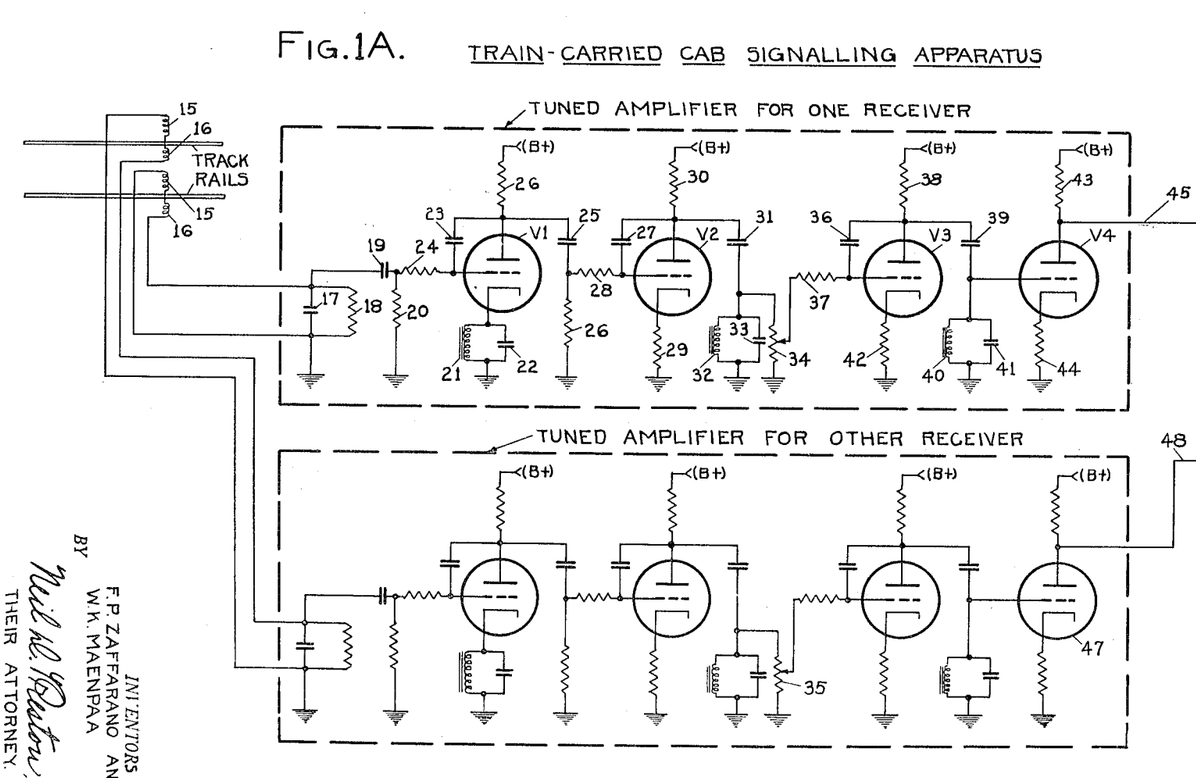
Figs. 1A and 1B, arranged end to end, illustrate diagrammatically the circuit organization of the vehicle-carried equipment embodying this invention.

A capacitor 17 is connected across the coils of each receiver to form an oscillatory circuit tuned to resonance at a predetermined frequency chosen with due consideration to the factors later discussed. As previously noted, the duration of a transient in the oscillatory receiver circuit depends upon its resistance losses. In the system of this invention, it is desired to have the transient of sufficient duration to utilize its frequency characteristics, but each transient should subside sometime before the next transient is produced, in order that there may be a definite time separation between the outputs for the successive transients at the highest code rate for proper operation of the decoding apparatus. An external resistor 18 of the appropriate value is connected in multiple with the coils of each receiver and its tuning capacitor 17 to provide damping of the oscillatory circuit to the degree necessary for obtaining the proper transient duration for the particular operating conditions.

*Amplifier.*—The transients produced in the oscillatory receiver circuits are amplified by a special frequency discriminatory electron tube amplifier, which is designed to provide an effective output suitable for operation of the decoding apparatus for each of the successive transients produced by the application and removal of the different kinds of coded rail current, and yet discriminate effectively against other kinds of periodic or steady-state excitation of the receiver circuits sufficiently to avoid unwanted outputs to interfere with periodic operation of the decoding apparatus.

Also, it is contemplated that an effective output for operation of the decoding apparatus requires coincidental time and phase excitation of the two receivers over the different track rails, in accordance with the disclosure of the prior application of Kendall et al., Ser. No. 227,164, filed May 19, 1951. Accordingly, the voltages in the two receiver oscillatory circuits are applied separately to their respective amplifiers or operating channels, and the outputs of these two amplifiers are combined in such a way that a controlling impulse for operation of the decoding apparatus occurs only when the transient voltages are in a time phase relation, which is characteristic of the coincidental receiver excitation by the simultaneous change in legitimate coded rail current in the two track rails. The structure and operating characteristics of these two amplifiers for the receivers are the same, and a description of one will suffice for both.

Referring to the amplifier illustrated in the upper part of Fig. 1A connected with the lower receiver, one side of the receiver oscillatory circuit, including the receiver coils 15 and 16, tuning capacitor 17, and damping resistor 18, is connected to ground, and the other side of this oscillatory circuit is connected to the grid of the first tube V1 of the amplifier. In the arrangement shown, the grid connection is made by a coupling capacitor 19 and a grid leak resistor 20, which have values selected so as to act as a high-pass filter to attenuate grid potentials for a lower range of frequencies, for reasons later discussed.

The grid of this first tube V1 is biased by cathode biasing for so-called Class A operation. This grid biasing is preferably provided by a resonant unit comprising an inductor 21 and a capacitor 22 connected in multiple, as disclosed in the prior application of Kendall et al. above mentioned. This cathode biasing unit is tuned to some frequency for which the maximum degree of degeneration is desired. For example, stray foreign currents in the track rails are likely to be of 60 cycle commercial power frequency. Also, it may be expedient to use 60 cycle code pulses, rather than a special 100 cycle frequency, when coded cab signalling is provided for existing installations of steadily energized track circuits with line wire control of wayside signals. Under such conditions, 60 cycle voltages at a relatively high energy level will be induced in the receiver circuits at times when no amplifier output is wanted, and it is desirable to tune the resonant cathode biasing unit to 60 cycle, so as to afford the maximum degeneration for receiver excitation at such frequency, and obtain more effective discrimination against unwanted response than is conveniently obtainable by the frequency discriminating characteristics of the tuned receiver circuits and amplifier. In this connection, it may be considered that the grid is automatically biased for a 60 cycle signal voltage by the inductor 21 and capacitor 22 when tuned to 60 cycles to an operating point where the variations in plate current are no more than needed to take care of the losses in the resonant circuit, regardless of the amplitude of the signal voltage. In short, this automatic cathode biasing unit when tuned for resonance at 60 cycles serves to reduce quite effectively undesirable inputs to the amplifier for steady-state excitation of the receiver circuits by stray or coded 60 cycle rail current.

The grid of the first tube V1 is also directly connected to its plate by a capacitor 23 for the purpose of providing a negative feedback most effective for a range of higher frequencies, so as to exclude unwanted amplifier outputs for certain forms of extraneous influences, and also obtain a more uniform amplifier output for different locations of the vehicle in the track circuit, as later discussed. The size of this feedback capacitor 23 is selected to provide a low impedance path for the prescribed high frequencies and apply substantial degenerative voltages from the plate to the cathode at such high frequencies. Since the load impedance for this tube V1, including the resistor 26 in its plate circuit is resistance, the feedback voltages are in the proper phase relation for degeneration, and there is a substantial reduction in the amplification of such frequencies that would otherwise exist. In this connection, an auxiliary resistor 24 is used in the grid circuit of this first tube V1 to supplement the grid leak resistor 20, so as to assure that there is a high impedance in the circuit path for the degenerative feedback voltages transferred from the plate to the grid by the negative feedback capacitor when the value of the grid leak resistor 20 is chosen to provide the high-pass filtering action above mentioned.

The output of the first tube V1 of the amplifier, represented by variations in its plate potential, is supplied through a coupling capacitor 25 to the grid circuit of the tube V2 of the second stage. The grid circuit for this tube V2 of the second stage is much the same as the grid circuit of the first tube, the grid resistor 26 combining with the coupling capacitor 25 to provide a similar high-pass filter, and a negative feedback capacitor 27 and auxiliary resistor 28 serving to provide degeneration for a range of the higher frequencies for the same purpose.

The grid of the second tube V2 is biased for Class A operation by a cathode resistor 29 in the usual manner; but this cathode resistor is preferably not by-passed by a capacitor, as is usually done, in order to retain the degenerative effect characteristic of a cathode resistor, and make the gain of the amplifier more uniform as tubes age or are replaced, or other changes occur in the operating characteristics of the tubes or other circuit elements. In other words, the degenerative effect of the cathode resistor 29, without any by-passing capacitor, is deliberately retained in the amplifier of this invention, in the interest of more stable and uniform amplifier operation and gain to take care of practical operating conditions, at the sacrifice of some gain and amplification, which may be made up by additional stages.

The supply voltage is connected to the plate of the second tube V2 through a load resistor 30, and the variations in plate potential are supplied through a coupling capacitor 31 to an inductor 32 and a parallel-connected capacitor 33 acting to provide plate circuit tuning for this second stage, which is preferably not employed for the first stage to avoid any tendency for self-oscillation. The inductor 32 is tuned by the capacitor 33 for resonance at a prescribed frequency to provide the desired band-pass frequency characteristics of the amplifier. Since an iron core will ordinarily be used for the inductor 32 to obtain the appropriate value of inductance for tuning to the desired frequency, the capacitor 31 blocks the flow of D. C. through the winding of this inductor from the supply voltage that might otherwise tend to vary its inductance and alter the desired tuning.

The output voltage of the second stage across the tuned circuit including inductor 32 and capacitor 33 is preferably applied to the grid circuit of the tube V3 of the next stage through a potentiometer 34 so that the gain of the amplifier may be regulated. A similar gain-adjusting potentiometer 35 is provided for the other amplifier illustrated in the lower part of Fig. 1A; and the gains for the respective amplifiers may be adjusted as required to obtain absolute and comparative levels of output to give the desired control of the coincidence means presently described.

The third stage of the amplifier involving tube V3 is similar to the second stage, and includes a negative feedback capacitor 36 and resistor 37 providing a high impedance between the grid of tube V3 and ground, together with a load resistor 38, blocking capacitor 39, an inductor 40 tuned by a parallel-connected capacitor 41 for resonance at the prescribed frequency, and a cathode resistor 42 without any by-passing capacitor for providing the appropriate grid bias voltage and a degenerative effect for amplifier stabilization, all for the same purpose as described in connection with tube V2.

In the arrangement illustrated, the alternating output voltage of the third amplifier stage, which is developed across the parallel-connected inductor 40 and capacitor 41, is applied to the control grid of an amplifier tube V4 of the final untuned stage of the amplifier. This tube V4 has a load resistor 43 and a cathode resistor 44 for providing the desired grid biasing voltage, which as shown is not by-passed by a capacitor so as to retain its degenerative effect for amplifier stabilization as previously described.

The output of the amplifier as a whole for the receiver and operating channel under consideration is represented by the alternating voltage appearing on wire 45, and a similar output for the other amplifier is applied to wire 48.

It should be understood that the particular organization and arrangement of tubes and circuit elements illustrated for the amplifiers respectively associated with the two receivers are merely typical or representative of amplifiers provided with tuned circuit elements between stages, plus other expedients in the way of negative feedback for certain frequencies and other expedients to amplify effectively a certain prescribed band of frequencies, and exclude or greatly attenuate higher and lower frequencies outside this pass-band of the amplifier, for reasons later explained in connection with the operating characteristics of the system of this invention.

Figures 1B, 2:
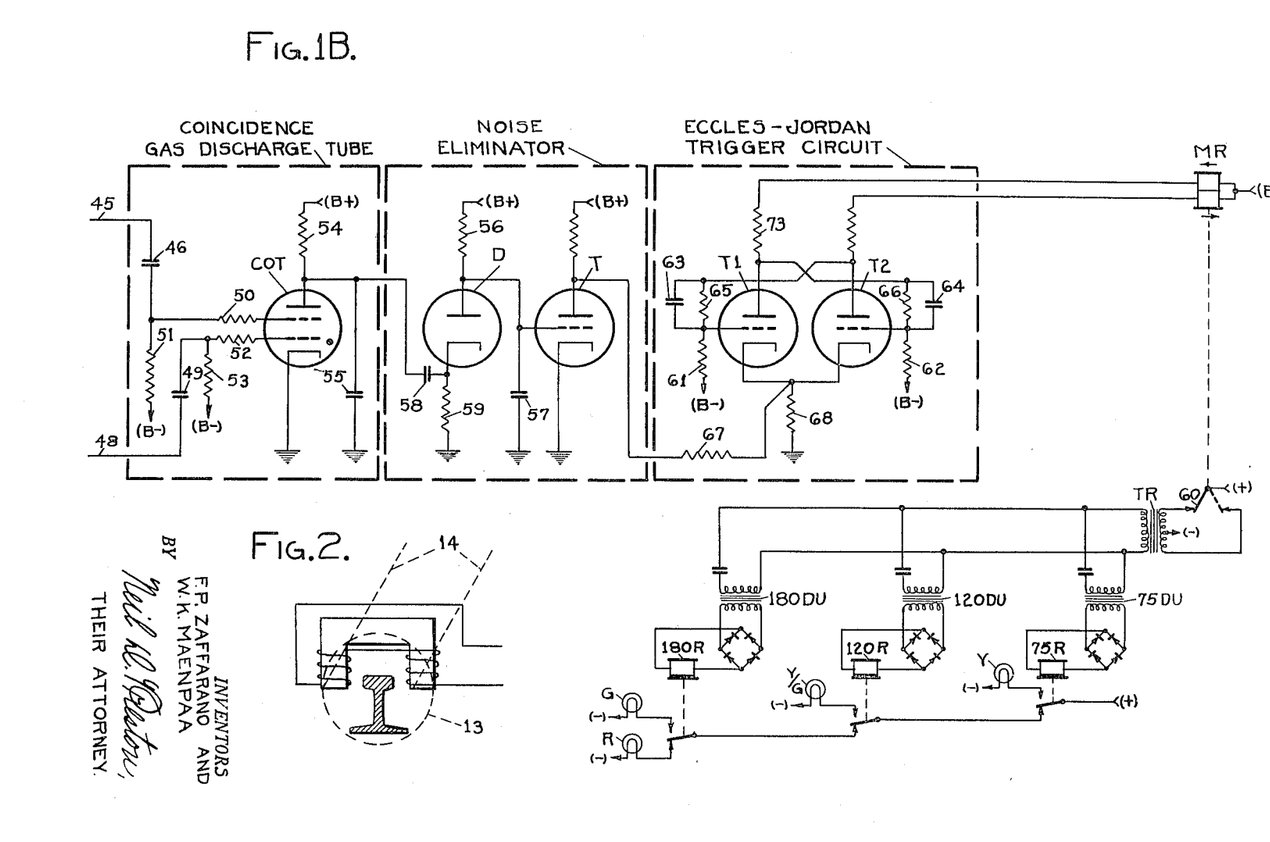
Fig. 2 is a diagrammatic view illustrating one of the vehicle-carried receivers and its binary coils in relation to a track rail.

*Coincidence tube.*—The output voltage of the amplifier channel is supplied over wire 45 through a coupling capacitor 46 to one of the two control elements of a tube COT in Fig. 1B, conveniently termed a coincidence tube. The output voltage of the other amplifier channel for the other receiver obtained from tube 47 is supplied over wire 48 through a similar coupling capacitor 49 to the other control element of said coincidence tube COT. This coincidence tube COT is preferably a gas tube, so that the alternating voltage outputs of the two amplifiers have to attain a certain level, as well as occur at the same time, before the tube COT conducts and provides any output. In the specific arrangement illustrated, it is assumed that the coincidence tube COT is a conventional thyratron with a shield grid and a control grid, either of which will prevent conduction through the tube when sufficiently negative with respect to the cathode.

As shown, the grid-cathode circuit of the upper shield grid of the coincidence gas tube COT includes the conventional grid-current-limiting resistor 50 ordinarily used with gas tubes, and a suitable source of negative grid biasing voltage indicated by the symbol (B—) connected to the grid through a grid leak resistor 51. The negative grid bias voltage is chosen so that the grid will assume its critical potential for firing the tube, subject to the existing control exercised by the other grid, when the alternating voltage output of the amplifier supplied over wire 45 through the coupling capacitor 46 attains a certain level corresponding with the response of the amplifier to transients, as distinctive from other amplifier outputs at some lower voltage level. The grid-cathode circuit of the other grid of the coincidence tube COT includes similar resistors 52 and 53 and a source of grid biasing voltage (B—).

The appropriate grid biasing voltages for the two control elements of this coincidence tube COT may be chosen, with such adjustment of the two amplifiers by the potentiometers 34 and 35 above described as may be necessary, such that the tube COT is rendered conductive only if the voltage output of the two amplifiers attain a prescribed level and are also substantially in phase. This is true when transients are produced in the two receiver windings by the application and removal of legitimate code pulses of rail current, since the currents in the track rails under the receivers change at the same time, and the voltages induced thereby in the receiver circuits are in phase. Most spurious voltages likely to be induced in the receiver coils in a manner to provide cumulative voltages, however, do not give voltage output for the two amplifiers at the level and in the time-phase relationship required to render this coincidence tube COT conductive. Accordingly, in addition to the binary coil arrangement previously discussed, separate amplifiers for the two receivers, together with the coincidence tube COT, serve to discriminate to a large degree against a great deal of the spurious and extraneous excitation of the receivers likely to be encountered. This feature of requiring coincidental excitation of the two receivers for effective output is disclosed in the prior application of Kendall et al., Ser. No. 227,164, filed May 19, 1951, and no claim is made herein to this feature of and by itself.

In the arrangement illustrated, the coincidence gas tube COT is self-extinguishing. The resistance of the load resistor 54 in the plate circuit of this tube is made so large that the supply voltage alone will not maintain conduction through the tube. While this tube COT is nonconducting, a capacitor 55, connected across it from its plate circuit to ground, is charged to a voltage corresponding with the supply voltage; and when this tube is rendered conductive, this capacitor discharges through the tube, whereupon its plate potential falls below the level for maintaining ionization, and the tube is extinguished. The capacitor 55 is then again charged, and the tube may again be rendered conductive.

*Noise eliminator.*—It is contemplated that the type of tube and circuit elements used in this arrangement will result in such a fast action that the coincidence tube will be fired repeatedly and give a series of outputs for the successive cycles of the transient voltages passed by the amplifiers. It is desirable, however, to have only one single controlling impulse for each of the transients as a whole for determining the existing code rate of the rail current; and accordingly, a device conveniently termed a noise eliminator is preferably controlled by the output of the coincidence tube COT for the purpose of providing a single controlling impulse for each of the successive transients.

The noise eliminator is essentially a timing device for giving a single impulse output in response to the closely spaced output pulses given by the type of coincidence device shown for each transient; and various types of timing devices may be adapted to perform this function. In the particular arrangement illustrated, the noise eliminator comprises a diode D and a triode T together with circuit elements and connections as shown, which operate in the manner described in detail in the Kendall et al. application previously mentioned.

Briefly outlining the operation of this form of noise eliminator to show generally how it acts in the organization of the present invention, the plate resistor 56 of the diode has such a high resistance that a very small amount of current between the grid and cathode of the triode T provides a voltage drop across this resistor nearly equal to the supply voltage, so that the plate of the diode D is substantially at ground potential, and the capacitor 57 connected between the diode plate and ground is essentially fully discharged. While the coincidence gas tube is nonconducting, the capacitor 58 coupling its plate with the cathode resistor 59 of the diode is charged to the level of the supply voltage.

If under these conditions the coincidence tube COT is rendered conductive, the coupling capacitor 58 discharges through this tube, and a voltage is developed across the cathode resistor 59 of the diode. It may be considered that this voltage across the cathode resistor 59 of the diode is applied across the discharge capacitor 57 in a direction to swing the grid of the triode abruptly negative beyond cut-off while this capacitor is charging, thereby providing an impulse output for the noise eliminator in the form of a sharp rise in the potential of the plate of the triode as it is rendered nonconductive. When the coincidence tube COT extinguishes itself, as previously explained, further charging of the capacitor and conduction through the diode ceases. The only discharge path for the capacitor 57, connected with the grid of the triode, is through the large resistance of the diode plate resistor 56, so that the triode is maintained nonconductive for a predetermined time. When the coincidence tube COT is again fired, the same operation of charging up the capacitor occurs; and by selection of the appropriate values of capacitance and resistance of the circuit elements, the triode may be maintained nonconductive after the initial firing of the coincidence tube as this coincidence tube is fired and extinguished in rapid succession for the successive cycles of the transient, thereby providing a single effective output during the transient period. Thus, even though the coincidence means is fast acting and follows the individual cycles of the transients passed by the amplifiers, the noise eliminator serves to provide only one impulse output for each transient as a whole.

*Decoding apparatus.* The function of the decoding apparatus constituting part of the vehicle-carried equipment of this invention in its broad aspect is to establish distinctive circuits for the different cab signal indications to be displayed by the selective energization of relays or the like, in accordance with the existence and the particular code rate of current in the track rails ahead of the vehicle from time to time, the code rate of the current in the track rails of the respective track sections being automatically determined by the trackway relays and circuits dependent upon existing traffic conditions in the well known manner. In other words, decoding apparatus acts to determine if the code pulses in the track rails being picked up on the vehicle are occurring at the rate of 75, or 120, or 180 times a minute, or do not exist at all because the vehicle is in a block already occupied by another train ahead.

Any suitable type of decoding apparatus capable of performing this function may be employed in the system of this invention. For example, the decoding apparatus may be of the type such as disclosed in the prior application of Kendall et al., Ser. No. 227,164, filed May 19, 1951, in which, generally speaking, electronic timing circuits and associated instrumentalities, including blanking and time gating circuits serve to detect the time interval between impulse outputs, and selectively energize relays according to the duration of these time intervals.

In the embodiment of the invention illustrated, it is assumed that the decoding apparatus will be of the familiar decoding transformer and resonant unit type, such as commonly used in conventional cab signal systems and coded track circuit signalling systems. This type of decoding apparatus diagrammatically illustrated at the right of Fig. 1B comprises a master relay MR of the polar type with two windings which act to operate its armature and contact finger 60 to opposite positions as its respective windings are energized. The contact finger 60 of this master relay MR controls the energization of the center-tapped primary of a master decoding transformer TR to generate alternating voltages in the secondary of this transformer which have a periodicity of frequencies corresponding with the code rate at which the master relay is being operated. The secondary of the transformer TR is connected to a plurality of resonant units 75DU, 120DU and 180DU, each relating to one of the different code rates of 75, 120 and 180 times a minute. Each of these resonant units comprises a transformer having its primary tuned by a series capacitor to the frequency for the corresponding code rate, and a full-wave rectifier connected to the secondary of this transformer and supplying unidirectional energizing current to the corresponding code-responsive relay 75R, 120R and 180R. This decoding apparatus operates in the well-known manner to selectively energize one of the code-responsive relays 75R, 120R or 180R in accordance with the code rate being received and the rate or rhythm at which the master relay MR is operating its contact finger.

The decoder relays 75R, 120R and 180R control circuits readily traced on the drawing for lighting suitable cab signal indicating lamps to display the appropriate indication for the respective code rates, or absence of any coding, such as R or red for stop, Y or yellow for caution, Y/G or yellow-green for approach-medium, and G or green for clear. These decoder relays 75R, etc. are each preferably made sufficiently slow releasing, using a slow release repeater relay if necessary, to hold up for a time when once energized longer than a plurality of the time intervals between successive transients, so that there is no change in cab signal indications as the vehicle passes from one track section to another, or if there should be an occasional or sporadic interruption in the series of the successive transients received due to the effect of extraneous influences. Also, the circuits controlling the indicating lamps are preferably arranged as shown so that an energization of a relay such as 180R for a high code rate will not be effective to light its indicating lamp unless the relays such as 120R and 75R for the lower code rates and more restrictive cab indications have released. Thus, if a vehicle is traveling, for example, in a caution block and picking up legitimate code pulses at the 75 code rate to maintain relay 75R energized, sporadic or occasional energization of relays 120R or 180R such as might be caused by extraneous interference is not effective at once to display an improper cab signal indication, and such energization of relay 120R or 180R is not effective to give a more favorable cab indication until the relay 75R is no longer energized by the reception of legitimate code pulses at the 75 code rate for a substantial time, say 3 or 4 seconds. In this way, occasional and sporadic improper energizaton of a decoder relay, while the vehicle is traveling with a more restrictive cab signal, will not act to display, even momentarily, an improper cab signal, and a change to a more favorable cab signal indication cannot occur until the coded response for a less favorable indication has been discontinued for a substantial time.

In the system of this invention, the code rate of the rail current being picked up on the vehicle is manifested by the time separation of relatively short impulse outputs from the noise eliminator, as the successive transients are produced in the receiver circuits by the application and removal of the rail current. In other words, the beginning and the end of each "on" period of the track code is marked by an impulse output from the noise eliminator, but there is no continuing output during the duration of the "on" period for operating the code following or master relay MR in the usual way. Accordingly, in the organization of this invention, a suitable device in the form of a trigger circuit or flip-flop is employed to control the energization of the two windings of the master relay MR alternately as the trigger device is intermittently operated between two stable conditions in response to the momentary impulse outputs from the noise eliminator.

The type of trigger circuit contemplated and illustrated in Fig. 1 for the embodiment of the invention illustrated is the well-known Eccles-Jordan type and the circuit connections and mode of operation of this form of trigger circuit are so familiar to those skilled in the art that a brief outline of its function and operating characteristics will be sufficient.

The trigger circuit shown comprises two triodes T1, T2 which have a grid biasing voltage indicated by (B—) connected to their grids through grid resistors 61 and 62 and tending to bias these grids beyond cut-off. The grid of each tube T1, T2 is connected to the plate of the other tube through parallel-connected capacitors 63 and 64 and resistors 65 and 66. The trigger circuit has two stable conditions, one where tube T1 is conducting and tube T2 is cut off, and the other where the latter tube T2 is conducting and tube T1 is cut off. In the stable condition where tube T1 is conducting, its plate is at a low potential, and the fixed biasing voltage for the other tube T2 is effective to maintain it cut-off, while the high plate potential of the nonconducting tube T2 causes a flow of current through resistor 65 and grid resistor 61 associated with the grid of the other tube T1 to overcome its fixed grid biasing voltage and maintain this tube T1 fully conductive.

Assuming the stable condition exists where tube T1 is conducting and tube T2 is cut-off, when the triode T of the noise eliminator is rendered nonconductive by the reception of a transient, as previously explained, the abrupt rise in its plate potential causes a sudden increase in the current through the auxiliary resistor 67 and the common cathode resistor 68 for the tubes T1 and T2 of the trigger circuit, thereby tending to render both of these tubes T1 and T2 nonconductive. Tube T2 is not affected, since it is already nonconductive, but the impulse output from the noise eliminator stops conduction through the tube T1. When the transient subsides to the level where the coincidence tube COT is no longer fired, and the output pulse from the noise eliminator is terminated, the cathodes of tubes T1 and T2 assume their normal potential, the tube T2 previously shut off is now the one that is rendered conductive, due to the action of the capacitor 64 associated with its grid; and the trigger circuit assumes its other stable condition.

Thus, tubes T1 and T2 of the trigger circuit are alternately rendered conductive by the successive impulse outputs from the noise eliminator in response to the successive transients; and the windings of the master relay MR included in the plate circuits of the respective tubes T1 and T2 are alternately energized at intervals corresponding with the time separation of the transients, thereby operating the master relay at the same rate as the code rate in the track rails producing such transients.

PRINCIPLES AND MODE OF OPERATION

With this explanation of the elements and functions of the parts constituting the organization for the vehicle-carried equipment of this invention, consideration may now be given to the principles and mode of operation of the system of this invention under various operating conditions.

As previously indicated, in the system of this invention the vehicle-carried equipment is adapted to operate over D. C. coded track circuits using code pulses in the track rails of direct current, such as commonly used for the control of wayside signals, and is also capable of operating without any change in circuit connections or the like over other types of coded track circuit providing pulses in the track rails of 60 or 100 cycle alternating current, or rectified 60 cycle A. C., as a railroad may find expedient to install for various stretches of track in cab signalling territory.

*D. C. code pulses.*—Considering first the operation of such universal type of vehicle-carried equipment with D. C. coded track circuits, the essential elements of one typical form of this type of coded track circuit are illustrated diagrammatically in Fig. 3A.

Figure 3A:
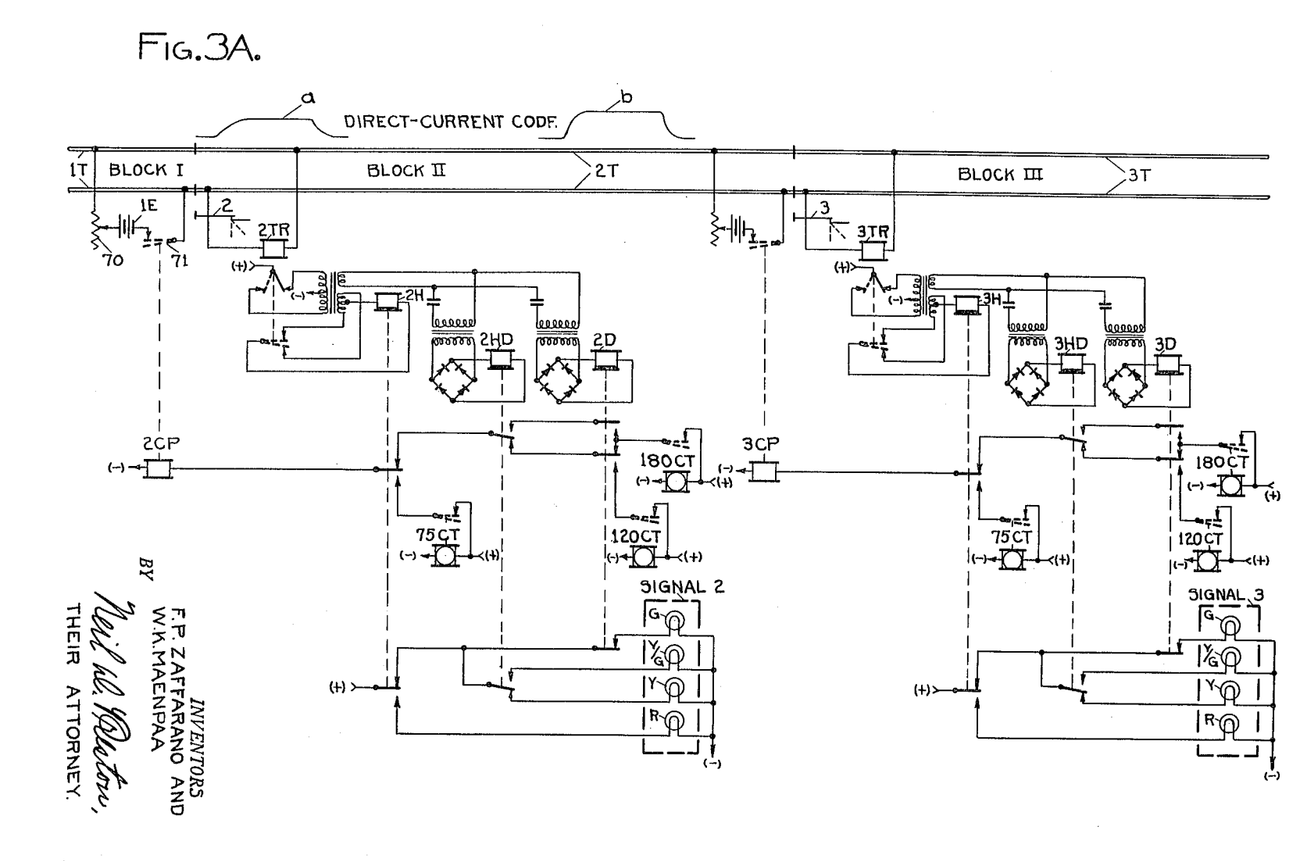
Figs. 3A and 3B illustrate diagrammatically typical coded track circuits employing different kinds of coded rail current with which the vehicle-carried equipment of this invention may be used.

It is assumed that the typical D. C. coded track circuit illustrated will be of the type using code rates of 75, 120 and 180 for so-called three-block indications, to conform with the type of decoding apparatus illustrated in Fig. 1B; but of course the same principles and mode of operation apply to coded track circuits using only two different code rates, such as 75 and 180, for caution and clear indications. Also, while the parts are shown in Fig. 3A for only two complete blocks, it is obvious that the same arrangement of apparatus in circuits may be extended for any desired number of blocks, including cut sections, and other variations or departures from the track circuits illustrated, in accordance with well-known practice. Further, the system of this invention is not limited to an automatic block signal system with three-signal indications for multiple track railroads, according to the typical track circuits illustrated, but may be used with any type of signalling system for single track railroads or the like, either with or without supervisory manual or centralized traffic control.

Referring to the track section constituting block II in Fig. 3A, a code-following track relay 2TR, preferably of the biased polar type, is connected across the track rails at the entrance end of the track section, and the intermittent coded operation of this track relay 2TR governs conventional decoding apparatus, such as illustrated, in the usual manner to cause the energization of a relay 2H, together with a relay HD, or 2D when said track relay is being operated at the code rates of 75, 120 and 180 times per minute respectively. These relays govern the indications of the associated wayside signals in the well known manner not shown, and also determine the rate of energization of the transmitter relay 2CP for the next track section in the rear by the particular code oscillator 75CT, 120CT and 180CT then effective to energize said transmitter relay, all in the well-known manner familiar to those skilled in the art.

The coded operation of the transmitter relay 2CP connects a suitable source of direct current 1E across the track rails of the exit end of the next track section I in the rear, in series with a resistor 70 providing the usual limiting resistance for the track circuit. In the case of a D. C. coded track circuit under consideration, this source of voltage 1E may be primary battery, or a storage battery trickle-charged from a power line.

The transmitter relay 2CP operates its contact 71 to apply the D. C. voltage across the track rails for the "on" periods of the existing code, separated by substantially equal "off" periods, as indicated at A in Fig. 4A. As the D. C. voltage is thus applied and removed, the electrical characteristics of the track circuits itself tend to modify the wave form of the actual current in the track rails ahead of the vehicle as it enters and travels through the track circuit; and there are variations in this wave form of rail current and the resultant transient voltages produced in the oscillatory receiver circuit under different operating conditions, which have to be taken into consideration in the system of this invention for consistent and safe operation of the decoding apparatus.

According to certain theoretical considerations substantiated by observation and test, it may be said that upon the application of the full D. C. voltage across the track rails, the resultant rise in rail current under the receivers of the vehicle is retarded by the linear inductance of the track rails between the point where the inter-rail potential is applied and the wheel shunt of the vehicle. When this D. C. voltage is removed at the end of the "on" period, the linear inductance of the track rails tends to maintain current in the same direction, but the distributed ballast resistance characteristic of a track circuit affords leakage paths for the inductance of the various portions of the track rails, so that the rail current tends to fall at a higher rate. The ballast resistance also tends to make the steady-state amplitude or intensity of the D. C. rail current much greater, often several times greater, at the exit or feed end of the track circuit than at its entrance end. Accordingly, there is a material difference in the wave forms of the rail current to be picked up by the vehicle at the entrance and exit end of a track circuit of the length commonly used, such as roughly indicated at *a* and *b* in Fig. 3A.

Although variations in the form of rail current ahead of the vehicle at various locations in the track section are dependent upon the length of the track section, existing value of ballast resistance, and other complicated factors, it may be considered that the leading edge of the code pulse of rail current rises more slowly and to a lower level at the entrance end than at the exit end, while the trailing edge at both the entrance and exit ends is definitely more abrupt than the leading edge for code pulses of rail current to be picked up near the entrance end of the track section. This characteristic is explained here more particularly in connection with coded direct current; however, it applies equally well when the rail current comprises alternating or rectified alternating current. In operating over track sections supplied with pulses of alternating current, for example, the rate of rise of rail current as each code pulse is applied is limited by the same factors that limit the rise of rail current in response to a direct-current pulse so that the current in the track rails rises from zero towards its final value (dependent upon the time of closure of the coding contact with respect to a complete cycle) more rapidly at the exit end of a track section than at the entrance end. At the end of each code pulse, the decay of alternating current is similarly affected by the same factors that affect the decay of direct current.

It is a familiar principle of electromagnetic induction that the voltage induced in a coil is dependent upon the rate of change in the magnetic flux through the coil. Accordingly, variations in the average and instantaneous rates of change in rail current, and the resultant variations in magnetic flux through the receiver coils, determine the wave front and amplitude of the induced voltage initiating the transient in the oscillatory receiver circuit. Although the nature of the transient voltages produced under such conditions is most complex, in general these transient voltages may be considered to be a damped train of waves of a fundamental frequency corresponding with the resonant frequency of the receiver oscillatory circuit, together with various frequency components representative of the wave front of rail current. Also, it may be considered that variations in the average slope of the rise or fall in rail current affects the amplitude of higher frequency components in the transient voltage combined with its fundamental frequency, and a more abrupt slope is indicative of additional higher frequencies.

Considering these factors in connection with the operating conditions for the system of this invention, it is evident that the cab signalling equipment should respond to the transient produced by the leading edge of the code pulses of rail current as soon as the vehicle enters a track section, even though the length of the track section, existing ballast conditions, and the like may cause the rail current to rise at a relatively slow average rate. Accordingly, the two amplifiers in the system of this invention are each organized to provide an effective output for operation of the decoding apparatus in response to the kind of transient produced under such conditions, i. e., near the entrance end of any one of the track sections in the equipped territory. More specifically, each amplifier is tuned, in the manner previously described, to give the maximum gain for the band frequencies which include the resonant frequency of the receiver oscillatory circuit and the principal or more significant frequency components characteristic of the leading edge of the code pulses to be picked up at the entrance end of a track section. Such pickup sensitivity will of course afford adequate amplifier output for the transients produced by the more abrupt rises and falls of rail current under other operating conditions.

Certain requirements of safety, however, impose limitations upon the pickup sensitivity that may be employed in practice. For example, assume the equipped vehicle enters a track section already occupied by another train, perhaps by a single locomotive or the rear car of a train near the exit end of the track section. Under such conditions, a coded voltage is being applied across the track rails at the exit end of the track section the same as if this other train were not present. Although the current in the track rails behind such train is made very small by the shunting action of its wheels and axles, the pickup sensitivity of the equipment on the following vehicle should not be so high that, as this vehicle gets near to the train ahead, an output to operate the decoding apparatus will occur, otherwise an improper cab signalling indication might be given under certain unfavorable conditions. In other words, in the interest of safety, it is desirable that the amplifier output should be essentially uniform for a given amount of rail current, largely independent of the variations in the rise and fall of such rail current.

For these reasons, to assure the desired performance in an occupied block, and also to obtain substantially the same output from the leading and trailing edges of the code pulses for decoding purposes, special expedients are incorporated in the amplifier of the system of this invention to exclude from the effective amplifier outputs the effects of the higher frequency components characteristic of the more abrupt changes in rail current and lacking in the rise of rail current at the entrance end of a long track section. This is preferably accomplished by providing, in addition to the frequency discrimination obtained by tuning the amplifier, a degenerative means to attenuate the unwanted higher frequency components as much as possible. In the particular arrangement illustrated, as previously explained, the capacitors 23, 27, and 36 between the plates and grids of tubes V1, V2, and V3 respectively for a plurality of stages of the amplifier provide negative feedback voltages to degenerate to a high degree the higher frequency components of the input voltage over the range of frequencies where the impedance of these capacitors is relatively low. Such degenerative action for the appropriate range of higher frequencies makes the amplifier output essentially uniform for the different wave forms of rail current to be picked up under the different operating conditions, thereby providing the kind of output needed for consistent and safe operation of the system.

Briefly reviewing the operation of the system in general for D. C. code pulses, and referring to the explanatory graphical illustrations in Fig. 4A, the distinction in the nature of the transient voltages resulting from application and removal of rail current are roughly indicated at C in Fig. 4A, without attempting to show the small variations in wave form indicative of the presence of the higher frequency components. Incidentally, the initial half-cycles of these transient voltages for rise and fall of rail current are of opposite polarity. The duration of the transient voltage is determined by the resistance losses in the receiver oscillatory circuit; and as previously indicated, it is contemplated that the transients will have sufficient duration to manifest their frequency characteristics, and yet subside before the next succeeding transient is produced at the highest code rate, the degree of damping for such objective being obtained by the appropriate value of external damping resistance.

Figure 4A:
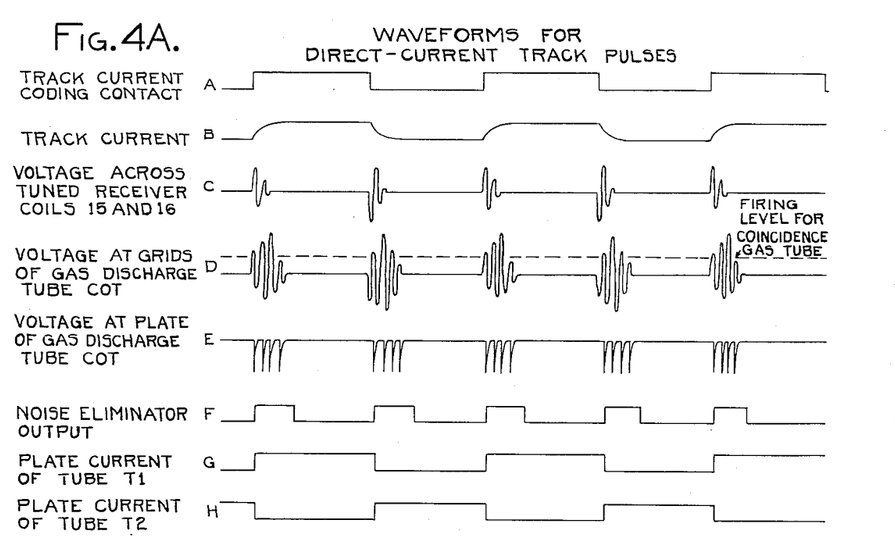
Figs. 4A and 4B are diagrams illustrating some of the instantaneous changes in current and voltage involved in the operation of the system, these diagrams being merely explanatory without any attempt to represent actual wave forms or quantitative values.

Assuming amplifiers tuned and provided with degeneration for certain frequencies as above described, the amplitude of the output voltages of these amplifiers, as applied to the grids of the coincidence tube COT will be essentially the same for the different transient voltages, as indicated at D in Fig. 4A. Since the transient voltages are produced by changes occurring simultaneously in the two track rails, the output voltages from the two amplifiers acting on the grids of the coincidence tube COT are in phase, and this tube is fired on the successive half-cycles of such voltage, so long as it exceeds the critical grid control voltage for the tube, thereby providing plate voltage pulses indicated at E in Fig. 4A. These voltage pulses, due to the discharge of capacitor 55 through the coincidence tube as it is rendered conductive, constitute a substantially uniform input for the noise eliminator. The single impulse output given by the noise eliminator for the transient as a whole, as previously explained and indicated at F in Fig. 4A, switches the trigger circuit from one stable condition to the other, as indicated at G in Fig. 4A, thereby causing alternate energization of the windings of the master relay and operating its contact finger 60 to opposite positions, as indicated at H in Fig. 4A, to cause operation of the decoding apparatus and display the proper cab signal indication for the particular code rate being received.

*A. C. code pulses.*—As previously indicated, the system of this invention is organized to be of a universal character and operate without a change on A. C. code pulses in the track rails, as well as the D. C. code pulses of the conventional coded track circuit commonly used for wayside signal control. Such A. C. code pulses may be encountered on railroads in a territory already equipped for continuous inductive cab signalling of the coded type and having A. C. code pulses in the track rails, ordinarily of a special 100 cycle frequency. Such A. C. code pulses may also be encountered in territory equipped with A .C. coded track circuits for wayside signal control.

Figure 3B:
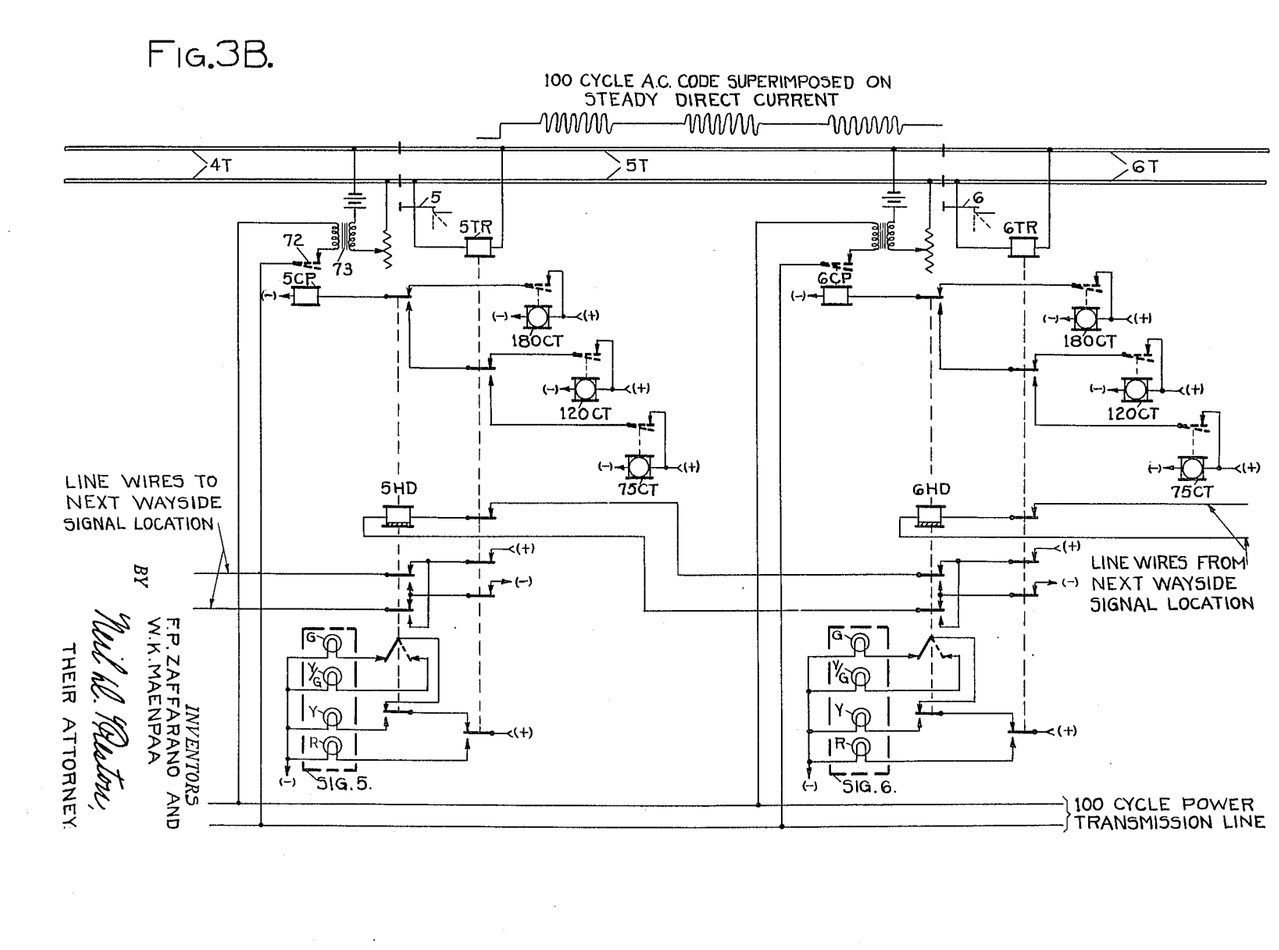

The trackway apparatus for such signalling systems employing A. C. code pulses may take a wide variety of forms; but for purposes of explanation it is desirable to consider a typical example such as illustrated in Fig. 3B, which assumes steadily energized D. C. track circuits and polarized line circuit control of the wayside signals, with superimposed 100 cycle A. C. pulses. The track circuits and polarized line circuits in the typical system illustrated in Fig. 3B act to control the indications of the wayside signals in a manner familiar to those skilled in the art and require no particular explanation. The 100 cycle cab signalling rail current is ordinarily obtained from a special power line; and in the arrangement illustrated, the coded operation of a transmitter relay 5CP intermittently energizes through its contact 72 the primary of a transformer 73 having its secondary in series with the track battery and usual limiting resistance of the track circuit, so that the 100 cycle code pulses are superimposed upon the D. C. track circuit current, as schematically indicated in Fig. 3B. This transmitter relay CP is operatively connected with the respective code transmitters 75CT, 120CT and 180CT by circuits controlled by the track relay TR and the polarized line relay HD, so as to select the code rate to be applied to a given block in accordance with existing traffic conditions.

Figure 4B:
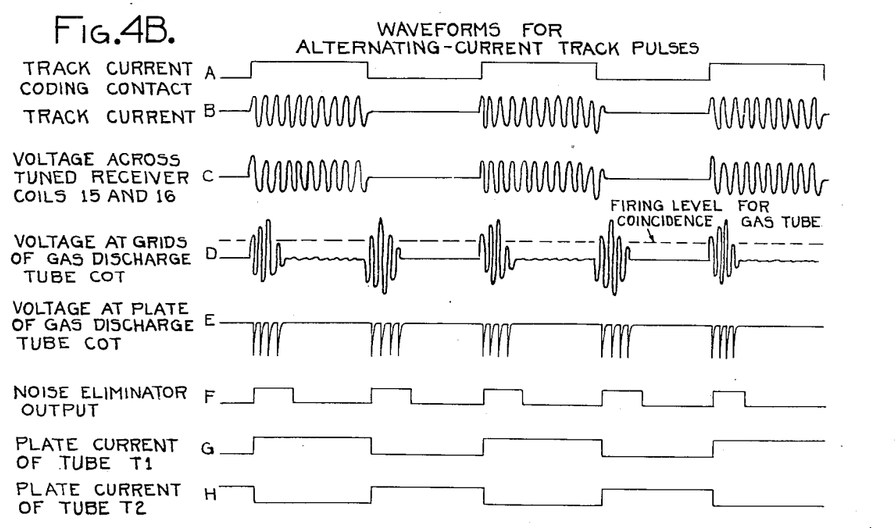

As previously indicated, the intial application and removal of an A. C. code pulse to the track rails is accompanied by transient voltages in the receiver oscillatory circuit, as these circuits adjust themselves from one steady state condition to another. In the case of the A. C. current pulse under consideration, some voltage is induced in the oscillatory circuit throughout the "on" period of the code, as indicated at B in Fig. 4B; but during the transient period this voltage is the resultant of transient and steady-state components, so that the voltage wave form is modified to include the frequency components of the transient voltage in a manner difficult to illustrate and merely indicated roughly in Fig. 4B. The frequency discriminating characteristics of the amplifiers already explained act to cause amplification of the frequency components of the transient voltages, while attenuating the 100 cycle frequency of the steady-state rail current, so that the effective amplifier outputs occur during the transient periods only, as indicated at D in Fig. 4B. Such amplifier output in response to the transients causes operation of the coincidence tube, noise eliminator, trigger circuit and master relay in the same manner as in the case of D. C. code pulses and repeated in Fig. 4B.

The system of this invention operates in the same manner for 60 cycle code pulses now sometimes used in coded track circuits, and likely to be used in preference to 100 cycles when a conventional wayside signalling system with line circuit control of the signal indications is to be included in cab signal territory and the vehicles are equipped to use the universal type of cab signalling equipment of this invention. In other words, the same sort of transient effects are produced by the application and removal of A. C. code pulses of different frequencies, and the vehicle-carried equipment of this invention responsive to such transients may be operated with like results over territories using any one of the different kinds of rail current the railroads may already have or may find it expedient to install.

In connection with this operation by A. C. code pulses, it is apparent that there should be no effective amplifier output for the steady-state condition of the A. C. pulse, otherwise there would be no distinctive time-separated impulse outputs to mark the beginning and end of the code pulses, suitable for operating the decoding apparatus in the same manner as in the case of D. C. code pulses. Hence the resonant frequency of the receiver oscillatory circuit, frequency band of the amplifier, and other filtering and degenerative expedients are employed in this invention to discriminate as much as possible from the steady-state frequency of the A. C. code pulses being used. In the case of 60 cycle code pulses, the automatic cathode biasing unit comprising inductor 21 and capacitor 22, previously discussed, acts to attenuate to a marked degree the steady-state 60 cycles, as well as stray power currents of 60 cycle frequency sometimes found in the track rails at places along the railroad. In other words, the frequency discriminating characteristics of the receiver oscillatory circuit and amplifiers is supplemented by the degenerative action of the cathode biasing unit for 60 cycle code pulses, which may involve somewhat higher currents for track relay operation than the 100 cycle cab signalling current superimposed upon track circuit current.

The operation of the vehicle-carried apparatus in response to rectified 60 cycle alternating current is much the same as for alternating current. Thus, each application and removal of a code pulse of rectified alternating current is effective to cause the desired oscillatory transient voltage to be induced in the receiver coils. In addition, as with the usual alternating current, a steady-state alternating voltage is induced in the receiver coils throughout the duration of each code pulse as a result of the alternating-current component present in the track rails at such time. If, for example, the track current comprises full-wave rectified 60 cycle current, a steady-state voltage at a frequency of 120 cycles will also be induced in the receiver coils, and the frequency discriminatory amplifier must therefore attenuate such 120 cycle frequency to the extent that an output will be produced only for the distinctive transient voltages occurring at the beginning and end of each code pulse.

With regard to the desirable resonant frequency to which the receiver windings should be tuned, there are a number of factors to be taken into consideration. This resonant frequency should be materially different from the steady-state frequency of stray or coded A. C. rail current to keep at a low level the amplitude of voltages applied to the tuned amplifier, giving due consideration to the more prominent harmonic components likely to be found in such steady-state A. C. rail current. For example, there is sometimes a prominent second harmonic of 60 cycles in the steady-state condition of a D. C. code pulse provided by a storage battery trickle charged from a power line through rectifiers in the conventional manner. In general, by way of illustration, and without limiting the invention, the receiver windings may be tuned to a resonant frequency in the order of 150 cycles, and the frequency band of the amplifiers may cover a range of about 60 cycles including said resonant frequency.

*Extraneous interference.*—As previously outlined, the pickup sensitivity, which is desirable for satisfactory operation in response to the transient effects produced by the application and removal of rail currents ordinarily used in coded track circuits, tends to give unwanted responses to spurious voltages induced in the receiver circuits for various reasons during operation of the vehicle. It will be evident that effective amplifier outputs, other than those due to legitimate code pulses in the track rails, tend to interfere with the proper operation of the decoding apparatus, so that the system should be organized to discriminate effectively against such extraneous interference encountered in the operation of the vehicle, as well as stray or coded currents in the track rails.

In general, spurious voltages in the receiver circuits of significant amplitude or energy level may be produced in various ways. The binary coil arrangement for the receivers previously described (see Fig. 2) avoids unwanted input to the respective amplifiers to the extent that the extraneous magnetic flux is in the same direction through the vertical core legs and receiver coils and the same change of flux occurs. Also, the use of separate amplifiers for the two receivers and the action of the coincidence tube, as previously discussed, serves to eliminate unwanted actuation of the noise eliminator and decoding apparatus by spurious voltage outputs from the receiver circuits to the extent that such voltages do not have the same time phase relation. However, there is such a wide variety of conditions under which spurious voltages of significant amplitude may be produced in the receiver coils, that the binary coil arrangement and coincident feature may not eliminate some kinds of extraneous interference sufficiently for satisfactory operation.

Considering one source of such extraneous interference, as the vehicle is in operation, the receivers may be moved along with the bodily movement of the vehicle in space relative to the flux lines of extraneous magnetic fields along the track, due to magnetized portions of the track rails, rail braces or anti-creepers, bridge structures, and the like. Such extraneous magnetic fields along the railroad as a rule represent a substantially uniform distribution of magnetic flux over an extensive region without any marked discontinuity or abrupt change in flux density; and as the receiver coils are moved through such fields during operation of the vehicle, the change in the excitation of the receiver oscillatory circuit is so gradual that it adjusts itself from one state of excitation to another without any substantial transient effects, in contrast to the abrupt flux changes produced by the application and removal of rail current. In other words, much of this kind of extraneous interference producing spurious voltages, often of relatively large amplitude, does not affect the operation of the system of this invention, because such voltages lack the particular frequency components of the transients to which the equipment of this invention responds.

Another source of spurious voltages tending to cause improper operation involves relative movement of the receiver coils and the magnetic flux lines of the earth's magnetic field, which is even stronger than the magnetic field established by rail currents ordinarily used through the receiver coils carried at some distance above the track rails. The binary coil arrangement eliminates a large part of this kind of interference; but there is likely to be some distortion of the earth's field or some tilting or twisting motion of the coils in this field in a manner to produce cumulative coil voltages, which also have a coincidental effect. It is desirable that such extraneous interference should be eliminated to the extent that it is repetitional or persistent enough to interfere with the proper decoding operation in the presence of legitimate code pulses, as distinctive from sporadic or occasional disturbances that may occur in a random fashion under exceptional circumstances.

As a general proposition, these spurious voltages not excluded by the binary coil arrangement or coincident feature, and due to the motion of the receiver coils along with the movement of the vehicle as a whole relative to the earth's uniform magnetic fields tend to produce flux changes in the receiver coils which lack either the abruptness for producing a substantial transient, or a steady-state frequency which will be amplified. The receivers, however, in addition to motion in space along with the body of the vehicle, are subjected to severe shocks and jars, and a certain amount of transmitted vibration, during movement of the vehicle over the ordinary railroad track with its frogs and switch points; and the local vibration of a receiver by itself in an extraneous magnetic field or in the earth's field may be induced by transmitted shock or vibration under some conditions to produce spurious voltages of a frequency that may be amplified and cause unwanted outputs.

In accordance with well-known principles of mechanical vibration, the frequency and amplitude of receiver vibration under such conditions, and the resultant frequency of the spurious voltage in its coils, are dependent upon its natural period of free vibration and degree of damping. In the system of this invention, the receiver cores and coils are considered as separate masses subjected to shock and transmitted vibrations, and are specially mounted or suspended on the vehicle, so as to have a natural period of free vibration well outside the frequency band of the amplifier, together with appropriate damping for restricting amplitude and frequency range for forced vibration. Thus, as the receivers are subjected to shocks and transmitted vibration during operation of the vehicle, the spurious voltages, due to the vibration of the receiver in a magnetic field, will have frequencies determined by a natural period of the receiver which will not be effectively amplified to give an unwanted output.

The desired natural period of receiver vibration may be obtained by including, in the connection between the receiver and its supporting member attached to the vehicle, such resilient and damping elements as may be appropriate for the type of vehicle and form of receiver suspension being used. Since the conditions dictating the kind of receiver mounting are so variable in practice, no specific receiver mounting structure has been illustrated, the present invention being directed to the system combination using a shock-mounted receiver, rather than to the mounting structure itself, which may be any suitable form of well-known shock-mountings, including the rubber block type commonly used in connection with mechanical vibration problems.

All of the various expedients above discussed for controlling or suppressing extraneous interference, while in a sense acting to some degree separately at different times, cooperate in the complete system combination of this invention to provide adequate segregation of the effects of the transients produced by code pulses of different kinds of current from the complex background of extraneous interference from all of the variety of sources likely to be encountered under practical operating conditions on railroads.

The underlying purpose, functions, principles and mode of operation, and the general attributes and advantages of this invention will be apparent from the foregoing description of a typical embodiment of the invention; but it should be understood that various adaptations, modifications, and additions may be made in the specific arrangement and organization of parts for the system illustrated and described without departing from the scope of the invention.

What we claim is:

1. Vehicle-carried equipment for a cab signalling system of the continuous inductive type responsive to different kinds of rail current applied to the track rails of track sections at different code rates comprising, receiver windings in inductive relation to the track rails and tuned to a predetermined resonant frequency different from that likely to be encountered in said rails, the voltage induced in said receiver windings upon the application and removal of each kind of rail current having a transient component with a fundamental frequency corresponding 1. with said resonant frequency of the receiver winding, damping means associated with said receiver winding for damping said transient component of induced voltage so that distinct time separations exist between successive induced transient voltages, transient responsive apparatus including a vacuum tube amplifier connected to said receiver windings and tuned to have the maximum gain for a limited band of frequencies including only the principal frequency components constituting said transients, and decoding means connected to said amplifier and establishing different control circuits in response to the time separation of outputs from said transient responsive apparatus, said tuned amplifier acting to discriminate between the principal frequency components of the transients induced in said receiver windings by the application and removal of the different kinds of rail current and the frequency of voltages otherwise induced in said receiver windings during operation of the vehicle by substantially attenuating other lower or higher frequencies.

2. In a continuous inductive cab signalling system for railroads, wherein alternating current is applied to the track sections at selected code rates in accordance with traffic conditions, vehicle-carried receiving apparatus including receiver coils mounted in an inductive relationship with said track rails and tuned to resonance at a selected frequency different from the frequency of said alternating current, said receiver coils having a voltage induced therein comprising a transient voltage corresponding to each application and removal of said rail current with a natural period related to said resonant frequency and also a steady alternating voltage throughout the duration of each alternating-current "on" period having a frequency corresponding to the frequency of said alternating track current, damping means associated with said receiver coils for limiting the duration of said induced transient voltages so that distinct separations exist between successive induced transient voltages, a tuned amplifier effective to supply an output for only a limited band of input frequencies including the principal frequency components constituting said transient voltage and excluding the frequency of said track current, and decoding means distinctively controlled according to the time spacing of the repetitive output of said amplifier in response to said transient voltages.

3. A continuous inductive cab signalling system for railroads wherein unidirectional current at various code rates is applied to the rails of certain of a plurality of track sections and alternating current at a selected frequency and with said various code rates is applied to the rails of the other of said track sections comprising, vehicle-carried apparatus including receiver coils tuned to a resonant frequency different from said selected frequency, the voltage induced in said receiver coils in response to said coded unidirectional current comprising a series of transient oscillations upon each application and removal of said direct current with said oscillations having a natural period related to the resonant frequency of said receiver coils and in response to said coded alternating current comprising a steady-state voltage at said selected frequency throughout the duration of each alternating-current "on" period in addition to said distinctive transient oscillations occurring at the application and removal thereof, damping means associated with said receiver coils for causing each transient oscillation to subside before the next is produced, thereby creating distinct time spacings between successive induced transient oscillations, amplifier means tuned to supply an output for only a limited band of input frequencies including the principal frequency components constituting said transient voltages and excluding the frequency of said alternating current, and decoding means distinctively controlled according to the time spacing of the repetitive output of said amplifier in response to said transient voltages.

4. Vehicle-carried apparatus for a cab signalling system of the continuous inductive type operable in response to either unidirectional or alternating track currents of various frequencies applied to the rails at selected rates according to traffic conditions comprising, receiver coils mounted so as to be inductively affected by changes in the magnetic field established by said track current and tuned to a selected resonant frequency different from the frequency of any alternating track current likely to be encountered in operation, said receiver coils having induced therein upon the application and removal of the different kinds of rail current an oscillatory transient voltage having its fundamental period related to the resonant frequency of said receiver coils and having also induced therein in response to said alternating track current a steady-state voltage at the frequency of said alternating track current, damping means associated with said receiver coils for damping said transient voltages to the extent that successive induced transient voltages are distinguishable from each other, transient responsive apparatus including an electron tube amplifier connected to said receiver coils, decoding apparatus distinctively controlled according to the rate of occurrence of outputs from said transient responsive apparatus, said amplifier tuned to give an output only for the range of frequencies including the principal frequency components of said transient voltages and discriminating against the frequency of said alternating track current, whereby said amplifier supplies an output to said decoding apparatus only in response to said transient voltages associated with the application and removal of the different kinds of rail current.

5. A cab signal system of the continuous inductive type for coded track circuits, responsive to code pulses of unidirectional current applied at different code rates to a plurality of track sections in accordance with traffic conditions and comprising, vehicle carried equipment including receiver windings in inductive relation to the track rails and tuned to a predetermined resonant frequency, damping means associated with said receiver coils for damping said transient voltages to the extent that successive induced transient voltages are distinguishable from each other, said receiver windings thereby having a transient voltage induced in said receiver windings at the beginning and the end of each code pulse of unidirectional current, said transient voltage when the vehicle is near the exit end of a track section including frequency components in addition to and higher than the frequency components of the transient voltage when the vehicle is near the entrance end of the track section, decoding means distinctively responsive to different code rates, apparatus including a vacuum tube amplifier connecting said receiver windings and said decoding means, said amplifier being tuned to a limited band of frequencies including the principal frequency components of the transient voltage induced in the receiver windings when the vehicle is at the entrance end of a track section, said amplifier discriminating against the higher frequency components associated with the transient voltage when the vehicle is near the exit end of the block, whereby the output of said apparatus is made substantially the same by said tuned amplifier as the vehicle moves through a coded track section.

6. Vehicle-carried equipment for a continuous inductive cab signalling system responsive to various kinds of rail current applied to the rails of track sections periodically at selected rates according to traffic conditions comprising, receiver windings tuned to a selected resonant frequency and positioned in an inductive relationship with said rails so that a transient voltage is induced in said receiver windings upon each application and removal of rail current, damping means associated with said receiver windings for damping said transient voltages to the extent that successive induced transient voltages are distinguishable from each other, said transient voltage produced by rail current near the exit end of a track section being of substantially greater amplitude than and including frequency components in addition to and higher than the frequency components of the transient voltage produced by rail current near the entrance end of said track section, decoding means establishing different control circuits for the cab signals in response to the different code rates, transient-responsive apparatus including an electron tube amplifier having maximum response for the range of frequencies including the frequency components constituting said transient voltage produced at the entrance end of a track section, said amplifier including electron tubes having a capacitor connected between plate and control grid to provide a degenerative feedback for the higher frequency components occurring in said transient voltage produced at the exit end of the track section, whereby the output of said amplifier is made substantially the same by said amplifier as the vehicle moves through a coded track section.

7. Vehicle-carried apparatus for a continuous inductive cab signalling system responsive to different kinds of currents applied to the track rails of track sections at distinctive rates according to traffic conditions and comprising, receiver windings tuned to a selected resonant frequency different from any frequency likely to be encountered in said rails and mounted in an inductive relationship with the track rails, the voltage induced in said receiver coils upon each application and removal of each kind of rail current including a transient component having a natural period corresponding to the resonant frequency of said tuned receiver coils, damping means associated with said receiver windings for damping said transient voltages to the extent that successive induced transient voltages are distinguishable from each other, transient-responsive apparatus including an electron tube amplifier tuned to have maximum response for a limited frequency band including the principal frequency components constituting said transient voltages, said amplifier including electron tubes having a capacitor connected between control grid and plate to provide a degenerative feedback for frequencies above said frequency band so as to limit the response of said amplifier to said higher frequencies, and decoding apparatus responsive to the output of said amplifier and distinctively controlled according to the time separation of outputs from said transient responsive apparatus.

8. Vehicle-carried equipment for a continuous inductive cab signalling system responsive to various kinds of rail current applied periodically at distinctive rates to the track rails of a plurality of track sections comprising, receiver coils in an inductive relationship with the track rails and tuned to a selected resonant frequency, the voltage induced in said receiver windings upon the application and removal of each kind of rail current including a transient voltage with its period related to the resonant frequency of said receiver coils, damping means for limiting the durations of said transient voltages to the extent that successive induced transient voltages are distinguishable from each other, an electron tube amplifier tuned to supply an output for only a limited range of input frequencies including the principal frequency components of said transient voltage, and decoding apparatus distinctively controlled according to the time spacing of the repetitive output of said amplifier in response to said transient voltages, said amplifier including a vacuum tube having a plate circuit comprising an iron core inductor with an associated shunt tuning capacitor, a blocking capacitor in series with said inductor, an auxiliary plate circuit for said tube including a source of direct-current plate potential and a series-connected resistor, whereby the inductance of said iron core inductor is not affected by the flow of direct current through it.

9. Vehicle-carried equipment for a continuous inductive cab signalling system responsive to various kinds of rail current applied periodically at distinctive rates to the track rails of a plurality of track sections comprising, receiver coils positioned in inductive relationship with the track rails and tuned to a selected resonant frequency, the voltage induced in said receiver windings upon the application and removal of each kind of rail current including a transient voltage with its period related to the resonant frequency of said receiver coils, damping means for limiting the durations of said transient voltages to the extent that successive induced transient voltages are distinguishable from each other, transient responsive apparatus including an electron tube amplifier tuned to supply an output for only a limited range of input frequencies including the principal frequency components of said transient voltage, decoding apparatus distinctively controlled according to the time spacing of the repetitive output of said amplifier in response to said transient voltages, said tuned amplifier including a vacuum tube having an inductor and associated shunt tuning capacitor in its common plate-cathode and control grid-cathode circuits tuned to resonance at an interfering frequency likely to be encountered in steady-state receiver excitation, a resistance coupled output circuit for said tube including a load resistance in its plate circuit, whereby oscillations in said amplifier organization are avoided.

10. A continuous inductive cab signalling system responsive to coded rail currents of different kinds comprising, vehicle-carried equipment including receiver coils mounted in an inductive relationship with the track rails and tuned to a selected resonant frequency, said receiver coils having induced in them upon the application and removal of said rail currents a voltage comprising an oscillatory transient with its fundamental period related to said resonant frequency, damping means for damping said transient voltages to the extent that successive induced transient voltages are distinguishable from each other, means for mounting said receiver coils to said vehicle to cause vibratory motion of said coils to occur at high frequencies above said resonant frequency, said receiver coils thereby having at times induced therein by relative motion between said coils and extraneous magnetic fields inductively affecting said coils steady-state voltages at frequencies substantially higher than said resonant frequency, transient-responsive apparatus connected to said receiver coils and including an electron tube amplifier, decoding apparatus distinctively controlled by the repetition rate of the output of said transient responsive apparatus as it responds to said transient voltages, said amplifier tuned to supply an output in response to a limited range of frequencies applied to its input including the principal frequency components constituting said transient voltages while discriminating against said higher frequencies, whereby said decoding apparatus is not affected by steady-state receiver excitation resulting from said extraneous magnetic fields.

11. A continuous inductive cab signalling system responsive to both unidirectional and alternating rail currents applied to the rails of track sections at various code rates, vehicle-carried apparatus comprising receiver coils in an inductive relationship with the track rails and tuned to a selected resonant frequency, said receiver coil having induced therein a transient voltage having a fundamental frequency related to the resonant frequency of said receiver coils, damping means associated with said receiver coils for limiting the duration of said induced transient voltages so that successively induced transient voltages are distinguishable, transient responsive apparatus including a tuned amplifier providing an output for only a limited band of frequencies applied to its input including said fundamental frequency, decoding means distinctively controlled according to the time spacing of the repetitive output of said amplifier in response to said transient voltages, means for mounting said receiver coils to said vehicle to cause vibration of said coils to occur at frequencies substantially higher than said fundamental frequency, whereby the steady-state voltage induced in said receiver coils by vibratory motion of said receiver coils relative to an extraneous magnetic field has a frequency higher than said band of frequencies and does not provide an output from said amplifier to affect said decoding means.

12. In a continuous inductive cab signalling system responsive to both unidirectional and alternating track currents applied to the rails of track sections at various code rates selected according to traffic conditions, vehicle-carried equipment including receiver coils in an inductive relationship with the track rails and tuned to a selected resonant frequency different from that likely to be encountered in said rails, said receiver coils having induced therein in response to the application and removal of the different kinds of rail current an oscillatory transient voltage with a natural period related to the resonant frequency of said receiver coils, damping means associated with said receiver coils for limiting the duration of said induced transient voltages so that successively induced transient voltages are distinguishable, transient responsive apparatus connected to said receiver coils and including an amplifier tuned to respond to only a limited range of frequencies including the principal frequency components of said transient voltage and excluding other frequencies likely to be encountered in steady-state receiver excitation, circuit means controlled by said transient responsive apparatus having two distinctive stable conditions and operated from one of said conditions to the other in response to successive outputs of said transient responsive apparatus as it responds to said transient voltages, decoding apparatus connected to said circuit means and establishing different control circuits for the cab signals in response to the rate of operation of said circuit means between its two opposite conditions.

13. A cab signalling system of the continuous inductive type including vehicle-carried equipment responsive without circuit change to both unidirectional and alternating currents applied to the rails of track sections at various code rates selected according to traffic conditions, said equipment comprising receiver coils mounted in an inductive relationship with the track rails and tuned to a selected frequency different from any frequency likely to be encountered in said rails, said receiver coils having distinctive transient voltages induced therein in response to each application and removal of rail current, damping means for causing said transient voltages to be mutually distinguishable, transient responsive apparatus including an electron tube frequency discriminatory amplifier providing a useful output only in response to said transient voltages, circuit means including a pair of electron tubes interconnected so as to be alternately operated from one of its stable conditions to the other in response to successive outputs of said transient response apparatus, and decoding apparatus establishing different control circuits in response to the rate of operation of said circuit means between its two conditions.

14. Vehicle-carried equipment for a cab signalling system of the continuous inductive type using direct current code pulses in the track rails applied at different rates selected in accordance with traffic conditions comprising, receiver windings mounted on the vehicle in inductive relation to each of the track rails, a receiving circuit for each rail including the receiver windings for that rail and a capacitor connected in multiple to render such receiving circuit resonant at a particular frequency, each of said receiving circuits being sufficiently damped so that successive transient voltages induced in its receiver windings upon the application and removal of successive code pulses in the track rails will cause distinct short series of waves having frequency components corresponding to said resonant frequency, a tuned amplifier for each receiving circuit and tuned to give a maximum gain for a limited band of frequencies inclusive of said resonant frequency and thereby amplify each short series of transient waves, a coincidence device connected to receive the output of each of said amplifiers and provide a single corresponding output only if such outputs of said amplifiers are in time phase, circuit means connected to receive the output of said coincidence device and including timing elements rendered active by each series of waves, and decoding means controlled by said circuit means and effective to establish different control circuits in accordance with the rate of activation of said timing elements.

15. Vehicle-carried equipment for cab signalling system of the continuous inductive type having direct current code pulses in the track rails applied at different rates selected in accordance with traffic conditions comprising, binary receiver windings mounted on the vehicle in inductive relation to each of the track rails, the binary receiver windings for each rail being located on the vertical legs of an iron core member, a receiving circuit for each rail including in series the receiver windings for that rail and connected in multiple with a capacitor to produce resonance at a particular frequency, each of said receiving circuits being sufficiently damped so that the transient voltages induced in its receiver windings upon the application and removal of successive code pulses in the track rails will cause mutually distinguishable short series of transient waves having frequency components corresponding to and adjacent said resonant frequency, a tuned amplifier for each receiving circuit being tuned to give a maximum gain for a limited band of frequencies on each side of said resonant frequency to thereby amplify each series of transient waves, a coincidence device including a vacuum tube having two control grids each respectively connected to the output of one of said amplifiers and effective to provide a single corresponding output when and only when the outputs of said amplifiers are in time phase, a noise eliminator connected to receive the output of said coincidence device and including timing elements initially rendered active at the beginning of each series of transient waves constituting the output of said coincidence device and maintained active throughout each such series, an electroresponsive means having two stable conditions connected to said noise eliminator so as to be actuated to an opposite condition each time said noise eliminator is initially rendered active, and decoding means controlled by said electroresponsive means to establish different control circuits in accordance with the rate said electroresponsive means is operated to its opposite stable conditions.

16. Vehicle-carried equipment for a cab signalling system of the continuous inductive type responsive to either direct current or alternating current applied to the track rails of track sections at different code rates comprising, receiver windings mounted on the vehicle in inductive relation to the track rails, a receiving circuit including said windings and an external capacitor connected in multiple therewith to provide a receiving circuit resonant to a predetermined frequency different from the frequency of any alternating current in the track rails, said receiving circuit being tuned to a relatively low frequency so that the transient voltages induced in said receiver windings upon the application and removal of each kind of rail current will be rich in frequency components corresponding to the resonant frequency of said receiving circuit, said receiving circuit including sufficient damping resistance to limit the duration of each transient voltage so that distinguishable spacing exists between successive induced transient voltages, a tuned vacuum tube amplifier connected to said receiving circuit and tuned to have a maximum gain for a limited band of frequencies including said resonant frequency, decoding means connected to receive the output of said tuned amplifier and establishing different control circuits in response to the time separation of the successive outputs of said amplifier occurring for a brief interval following each application and each removal of rail current, and cab signalling apparatus distinctively controlled by said decoding means to give different indications in accordance with the existing code in the track rails.

17. Vehicle-carried equipment for a cab signalling system of the continuous inductive type to respond to either direct current or alternating current code pulses applied to the track rails of track sections at rates selected in accordance with traffic conditions comprising, receiver windings mounted on the vehicle in inductive relation to the track rails, a receiving circuit including said windings, a capacitor, and a resistor all connected in multiple to render such receiving circuit resonant to a predetermined frequency different from the frequency of any alternating current in the track rails, said receiving circuit being tuned to a relatively low frequency and sufficiently damped so that the transient voltages induced in said receiver windings upon successive applications and removals of code pulses for either kind of rail current will produce distinguishably spaced damped wave trains having frequency components corresponding to said resonant frequency, a tuned vacuum tube amplifier connected to said receiving circuit and tuned to have a maximum gain for a limited band of frequencies including said resonant frequency, a negative feedback connection for said tuned amplifier including a capacitor for more readily passing frequencies above said band of frequencies to render said amplifier degenerative with respect to such higher frequencies, and decoding means connected to receive the output of said tund amplifier and establishing different control circuits in accordance with the time separation betwen successive outputs of said amplifier occurring upon each application and each removal of rail current.

18. Vehicle-carried equipment for a cab signalling system of the continuous inductive type adapted to respond to either direct current or alternating current code pulses applied to the track rails of track sections at rates selected in accordance with traffic conditions comprising, receiver windings mounted on the vehicle in inductive relation to the track rails, a receiving circuit including said windings and an external capacitor connected in multiple to provide a receiving circuit resonant at a predetermined frequency different from the frequency of any alternating current in the track rails, said receiving circuit being tuned to a relatively low frequency and being sufficiently damped so that the transient voltages induced in said receiver windings upon the application and removal of successive code pulses for either kind of rail current will produce mutually distinguishable short series of waves having frequency components corresponding to said resonant frequency, a tuned vacuum tube amplifier connected to said receiving circuit and tuned to have a maximum gain for a limited band of frequencies on each side of said resonant frequency to thereby provide an output of a short series of damped waves at the beginning and end of each code pulse in the track rails but acting to attenuate any steady-state alternating current induced in the receiver windings from the track rails, a device connected to receive the output of said amplifier and including timing elements, said device being rendered active by each series of waves constituting the output of said amplifier, and decoding means controlled by said device and effective to establish different control circuits in accordance with the time separation between successive actuation of said device.

19. Vehicle-carried equipment for a cab signalling system of the continuous inductive type using direct current code pulses in the track rails applied at different rates selected in accordance with traffic conditions comprising, binary receiver windings for each rail, each winding being mounted on the vehicle with its axis in a vertical plane to minimize the effect of the earth's magnetic field and in inductive relationship to its rail, a receiving circuit for each rail connecting said windings for that rail in series and connecting a capacitor in multiple with said windings to make the receiving circuit resonant at a preselected frequency different from extraneous frequencies likely to be encountered in said rails, said receiving circuit being tuned to a relatively low preselected frequency and being sufficiently damped so that the application and removal of successive code pulses in the track rails will induce transient voltages in said receiver windings and cause mutually distinguishable short series of transient waves each having main frequency components corresponding to and adjacent said resonant frequency, an amplifier for each receiving circuit tuned to amplify voltages of said resonant frequency and a narrow band of frequencies on each side to thereby amplify the main transient voltages induced in said windings upon the application and removal of each code pulse but acting to attenuate voltages of said other extraneous frequencies, a coincidence device constructed to pass said transient voltages of said band of frequencies from both said amplifiers only providing such voltages from said two amplifiers are in time phase with respect to each other, and decoding apparatus governed by the output of said coincidence device to establish different circuits dependent upon the rate of reoccurrence of said different series of transient waves appearing as an output of said coincidence device.

20. In a continuous inductive cab signalling system wherein various kinds of rail current are applied at different selected code rates in accordance with traffic conditions in combination with vehicle-carried equipment comprising, receiver windings mounted on the vehicle in inductive relation with the track rails and tuned to a selected resonant frequency different from any steady-state frequencies likely to be encountered in said rails said windings having induced therein transient voltages with frequency components adjacent said resonant frequency upon the application and removal of each kind of rail current for the different code pulses of any track section, damping means associated with said receiver windings for limiting the duration of each induced transient voltage so that successive induced transient voltages are distinguishable from each other, an electron tube amplifier including tuning elements and degenerative circuit connections to cause the amplification of the transient voltages having frequencies within a narrow band adjacent said resonant frequency but attenuating voltages of a frequency above or below such band to thereby remove any steady-state alternating current voltages from the output of said amplifier and to remove random voltages not having the frequency characteristics of said transient voltages, circuit means acting to convert the damped transient voltages associated with each application and each removal of a code pulse to single control conditions, electroresponsive means having two stable conditions and operated to such stable conditions alternately upon the reception of successive control conditions from said circuit means, and decoding means operated to give distinctive indications dependent upon the rate of operation of said electroresponsive means to its opposite conditions.

References Cited in the file of this patent

UNITED STATES PATENTS

| | | |
|---|---|---|
| 2,197,416 | Place | Apr. 16, 1940 |
| 2,206,579 | Place | July 2, 1940 |
| 2,293,307 | Place | Aug. 18, 1942 |
| 2,312,050 | Place | Feb. 23, 1943 |
| 2,371,568 | Wintsch | Mar. 13, 1945 |
| 2,591,247 | Farnsworth | Apr. 1, 1952 |